(12) United States Patent
Srivilliputhur (10) Patent No.: US 11,721,858 B2
(45) Date of Patent: Aug. 8, 2023

(54) SUCCOR: A SUPER CRITICAL COOLING REGULATOR TO MITIGATE HEATING OF BATTERIES AND OTHER DEVICES

(71) Applicant: Kesavan Moses Srivilliputhur, Denton, TX (US)

(72) Inventor: Kesavan Moses Srivilliputhur, Denton, TX (US)

(*) Notice: Subject to any disclaimer, the term of this patent is extended or adjusted under 35 U.S.C. 154(b) by 159 days.

(21) Appl. No.: 17/120,048

(22) Filed: Dec. 11, 2020

(65) Prior Publication Data

US 2022/0190405 A1    Jun. 16, 2022

(51) Int. Cl.
| | |
|---|---|
| *H01M 10/6567* | (2014.01) |
| *H01M 10/6551* | (2014.01) |
| *H01M 10/613* | (2014.01) |
| *H01M 50/184* | (2021.01) |

(52) U.S. Cl.
CPC ..... *H01M 10/6567* (2015.04); *H01M 10/613* (2015.04); *H01M 10/6551* (2015.04); *H01M 50/184* (2021.01)

(58) Field of Classification Search
CPC ..... H01M 10/60–667; H01M 10/6567; H01M 10/613; H01M 10/6551
See application file for complete search history.

(56) References Cited

U.S. PATENT DOCUMENTS

| | | |
|---|---|---|
| 3,237,403 A | 3/1966 | Feher |
| 3,512,582 A | 5/1970 | Chu et al. |
| 6,134,900 A | 10/2000 | Nishida et al. |
| 6,591,618 B1 | 7/2003 | Howard et al. |
| 6,698,214 B2 | 3/2004 | Chordia |
| 8,014,150 B2 | 9/2011 | Campbell et al. |
| 9,408,332 B2 | 8/2016 | Smith |
| 2004/0237549 A1 | 12/2004 | Okawara et al. |

(Continued)

FOREIGN PATENT DOCUMENTS

EP    3573222 A1    5/2019

OTHER PUBLICATIONS

Gregory Offer, Yatish Patel, Alastair Hales, Laura Bravo Diaz, Mohamed Marzook, "Cool metric for lithium-ion batteries could spur progress," Nature, Jun. 25, 2020, p. 485-487, vol. 583, Publisher Springer Nature Limited (London).

(Continued)

*Primary Examiner* — Eugenia Wang (57) ABSTRACT

Batteries and other devices heat during operation and must be cooled to optimal temperatures. Our SuCCoR method differs from the previous thermal management systems by keeping batteries and devices continuously immersed in a coolant bath kept in a sealed enclosure at its supercritical fluid (SCF) and/or a neighboring thermodynamic state with superb heat conducting properties. While many previous inventions circulated coolants, and some kept devices sealed in a fluid, our invention differs by its use of SCF coolants with no distinct liquid and gas phases. Such a single-phase coolant prevents abrupt loss of cooling due to "vapor lock" formation. Also, using an outer jacketed vessel and a network of heat conducting pipes containing high thermal conductivity and high heat capacity coolants, and deploying cooling fins will enhance efficiency and accelerate heat removal. Our system avoids complex pumps to circulate the coolants, and is lighter and cheaper.

1 Claim, 5 Drawing Sheets

(56) References Cited

U.S. PATENT DOCUMENTS

| | | | |
|---|---|---|---|
| 2006/0005994 A1 | 1/2006 | Imai et al. | |
| 2009/0113903 A1 | 5/2009 | Babkin | |
| 2010/0159306 A1* | 6/2010 | Leuthner | H01M 50/20 |
| | | | 429/53 |
| 2011/0317367 A1 | 12/2011 | Campbell et al. | |
| 2017/0325355 A1 | 11/2017 | Lau | |

OTHER PUBLICATIONS

R. Llopis, L. Nebot-Andrés, D. Sánchez, J. Catalán-Gil, R. Cabello, "Sub-cooling methods for CO2 refrigeration cycles. a review," International Journal of Refrigeration, 2018, pp. 85-139, vol. 93, Elsevier (Holland).

NIST species data by chemical formula. [online] Available at: https://webbook.nist.gov/chemistry/form-ser/.

Chemistry LibreTexts. 2020. Supercritical Fluids, [online] Available at: < https://chem.libretexts.org/Bookshelves/Physical_and_Theoretical_Chemistry_Textbook_Maps/Supplemental_Modules_(Physical_and_Theoretical_Chemistry)/Physical_Properties_of_Matter/States_of_Matter/Supercritical_Fluids>.

* cited by examiner

FIGURE 5: $T_C$ and $P_C$ are respectively critical temperature and pressure.

SUCCOR: A SUPER CRITICAL COOLING REGULATOR TO MITIGATE HEATING OF BATTERIES AND OTHER DEVICES

CROSS-REFERENCE TO RELATED APPLICATIONS

Patent Documents

1) U.S. Pat. No. 8,014,150B2, Cooled electronic module with pump-enhanced, dielectric fluid immersion-cooling, Publication Date 2011 Sep. 6.
2) US20110315355A1, Immersion-cooling apparatus and method for an electronic subsystem of an electronics rack, Publication Date 2011 Dec. 29.
3) U.S. Pat. No. 6,698,214B2, Method of refrigeration with enhanced cooling capacity and efficiency, Publication Date 2004 Mar. 2.
4) U.S. Pat. No. 9,408,332B2, System and method for fluid cooling of electronic devices installed in a sealed enclosure, Publication Date 2016 Aug. 2.
5) US20170325355A1, Immersion cooling, Publication Date 2017 Nov. 9.
6) U.S. Pat. No. 3,512,582A, Immersion cooling system for modularly packaged components, Publication Date 1970 May 19 (Expired-Lifetime).
7) U.S. Pat. No. 3,237,403A, Supercritical cycle heat engine, Publication Date 1966 Mar. 1.
8) U.S. Pat. No. 6,134,900A, Supercritical refrigerating system, Publication Date 2000 Oct. 24.
9) U.S. Pat. No. 6,591,618B1, Supercritical refrigeration system, Publication Date 2003 Jul. 15.
10) US20040237549A1, Air conditioning apparatus using supercritical refrigerant for vehicle, Publication Date 2004 Dec. 2.
11) US20090113903A1, Cooling methods and systems using supercritical fluids, Publication Date 2012 Jan. 3.
12) EP3573222A1, Supercritical cooling system, Publication Date 2019 Nov. 27 (Pending).
13) US20060059945A1, Method for single-phase supercritical carbon dioxide cooling, Publication Date 2006 Mar. 23 (Abandoned).
14) US20100159306A1, Device having at least one electrochemical cell, and method for operating a device having at least one electrochemical cell, Publication Date 2010 Jun. 24 (Abandoned).

OTHER REFERENCES

1. Gregory Offer, Yatish Patel, Alastair Hales, Laura Bravo Diaz, Mohamed Marzook, *Cool metric for lithium-ion batteries could spur progress*, Nature, vol. 583, p. 495 (25 Jun., 2020).
2. R. Llopis, L. Nebot-Andrés, D. Sanchez, J. Catalan-Gil, R. Cabello, *Subcooling methods for $CO_2$ refrigeration cycles. a review*, International Journal of Refrigeration, vol. 93, p. 85 (2018).
3. Chemistry LibreTexts. 2020. *Supercritical Fluids*. [online] Available at: <https://chemlibretexts.org/Bookshelves/Physical_and_Theoretical_Chemistry_Textbook_Maps/Supplemental_Modules_(Physical_and_Theoretical_Chemistry)/Physical_Properties_of_Matter/States_of_Matter/Supercritical_Fluids>[Accessed 3 Aug. 2020].
4. NIST species data by chemical formula, https://webbook.nist.gov/chemistry/form-ser/

STATEMENT REGARDING FEDERALLY SPONSORED RESEARCH

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This disclosure presents a thermal management regulator and method to aid efficient cooling of batteries and other electronic devices including but not limited to computer systems, smart grids, and transformers by installing such power sources and devices in a fluid-tight enclosure containing supercritical fluid coolants with various configurations of heat exchange and pressure control. This system does not require complicated and expensive pumps to move fluids, and can be manufactured in desired geometries cheaply and easily via mature manufacturing techniques. There are no dimensional and/or geometry-imposed constraints and/or limitations on the methodology and embodiments outlined here. Similarly, the applicability of our methodology and embodiments are not constrained and/or in any way limited by the dimensions and/or geometry of the cooled batteries and devices.

Battery packs such as the ubiquitous Lithium-ion, and many other devices generate significant quantity of heat during their charging and/or operation. The efficient operation and also functional lifetime of such devices is significantly degraded by excess heat buildup and temperature gradient established between their various components. Numerous methods mitigate such heat buildup by transferring and rejecting it into an external environment (the so-called sink), far from the devices. For example, a battery pack in current and emerging generation of electric automobiles holds the energy equivalent of over 6000 smart phone batteries. It is cooled by pumping coolant fluids through an intricate channel network. This process is effective, but is both complex and expensive because it requires the construction and constant operation of numerous intricate systems to produce the desired environment, which also makes the battery packs heavy and inefficient. Note that in this document, the term battery packs will broadly refer to power generation systems and power consuming devices and/or machines, all of which often generate significant amount of heat during their operation, and need cooling to continue operating optimally.

Many methods for cooling batteries and devices circulate coolants such as air, water, water-propylene glycol (PG)/ethylene glycol (EG) mixtures, or oil, either in predominately liquid phase, gaseous phase, or in a combination of liquid phase and gaseous phase. Higher cooling performance were also realized by immersing entire electronic devices/machines in coolant liquid, and circulating the liquid out of its sealed container to remove heat (for example U.S. Pat. No. U.S. Pat. Nos. 3,512,582A, 4,590,538, 8,014,150B2, 20110315355A1, 6,698,214B2, 20170325355A1). Liquid coolants are advantageous because they conduct heat one to two orders of magnitude faster than gas-based coolants. However, their high viscosity imposes significant pumping power needs to circulate them to enable efficient cooling. Also, water or water-PG/EG mixtures are limited in terms of operating temperature below (100) to 120 degrees Celsius. Their use in electrical systems imposes peculiar challenges to avoid short-circuit because of their poor dielectric properties (and high electrical conductivity) unless they are in a very pure state. While Oil has superior dielectric properties and thermal conductivity, however, it is undesirable because of its flammable and high viscosity.

A supercritical fluid (SCF) offers a superior alternative to using just gas and/or liquid phase coolants (for example U.S. Pat. No. U.S. Pat. No. 3,237,403A, U.S. Pat. No. U.S. Pat. No. 6,134,900A, U.S. Pat. No. U.S. Pat. No. 6,591,618B1). SCF is any substance at a temperature and pressure above its so-called critical point, where distinct liquid and gas phases do not exist. It is important to note that SCF state, although a single phase, is characterized by our inability to distinguish whether the matter is a liquid or a gas, and as a result do not have a definite phase. This can be rationalized by thinking that above the critical temperature ($T_C$), the high kinetic energy of the molecules helps them overcome intermolecular forces that cause condensation into a liquid. Similarly, pressures above the critical pressure ($P_C$) prevents a fluid staying as a pure gas. The SCF phase properties have been harnessed into numerous refrigeration systems and heat engines largely by pumping of SCF coolants over the objects that needed cooling (for example U.S. Pat. Nos. 3,237,403A, 6,134,900A, 6,591,618B1, 20040237549A1, 20090113903A1, 20060059945A1, 20060059945A1, pending Euro. Pat. No. 3573222A1). It is important to note that previously disclosures of immersion cooling proposed do not use SCF coolants, but instead they seal liquid and/or gas phase coolants with the devices in an enclosure (U.S. Pat. No. 9,408,332B2, U.S. Pat. No. 20170325355A1). Our disclosure crucially differs from such earlier ones by its use of coolants in their SCF state wherein distinct liquid and gas phases do not exist as highlighted earlier. Examples of refrigerants that may be used as SCF coolants in embodiments described herein include Carbon dioxide, R134A, and/or R1234yf.

Previously published embodiments of using SCF coolants included raising pressure of a cooling fluid in cooling circuits to above a supercritical pressure, and taking the fluid into its supercritical state at a temperature to which the cooling circuit is exposed. The method also included moving the cooling fluid through the cooling circuit via sophisticated pumps while the fluid is in a supercritical state to cool a machine. Variations of this embodiment include configurations with one or more pumps, one or more temperature sensors, and a controller that monitors and varies the temperature and pressure of the cooling fluid in the cooling circuit. Designing, building, and deploying this embodiment is both expensive and a challenge, and may not be suitable and/or efficient to cool high-density battery packs and in many emerging applications such as smart electric grids and electric vehicles. For example, emerging high-density battery packs contain several thousands of cells composed of disparate materials' layers, including electrodes, electrolytes, separators, and current collectors, packed into very close proximities. The layers may be sandwiched together and/or curled into other complex cell geometries. Rapidly and efficiently removing enormous quantities of heat generated in such applications is critically necessary to prevent overheating and even fire accidents. Furthermore, as described below, the electrochemical performance of a cell is also a sensitive function of the temperature.

Consider the illustrative battery example discussed in [0005]. The electric current flows in and out of a cell through metallic current collectors that are connected to the positive and negative terminals (the so-called 'tabs') of the cell. The electrodes, electrolyte and separator of the cells are sandwiched between these collectors. While the metallic current collectors conduct heat efficiently, the other cell components mentioned above are thermal insulators, and consequently heat transfer across cell layers is sluggish compared to the transfer along a layer. Thus, the electric current flow, and the attendant heat generation, is both spatially and temporally non-uniform.

A battery cell is effective, stable, and shows high electrochemical performance when identical thermal conditions are created within by removing heat at the same rate from each layer. This strongly depends on the temperature surrounding each layer because the resistance to current flow decreases at higher temperatures. A temperature gradient is produced between two neighboring layers when their thermal conditions differ. This creates different rates of current flow in affected layers and can drive the hotter layer to run out of energy more quickly while retaining some energy in the colder layer. This reduces both the power output of the cell and also contribute to the faster degradation of the cell. Temperature gradients can be eliminated only when heat is removed at the same rate from each layer. This cannot be achieved by conventional surface cooling. The usually efficient tab cooling is also not viable in many new cells because their tabs are often thin, small, and closely spaced form each other, which can make these cells very hot.

Therefore, thermal management systems for current and emerging high-energy density battery packs are large and cumbersome, which significantly increases weight, inefficiency, and complexity of manufacturing. Use of SCF may accomplish this feat because the fluid molecules can intimately flow over and even in-between the smallest gaps between various device components. The invention described in this application is expected to substantially mitigate such difficulties and efficiently cool battery packs and/or other devices.

BRIEF SUMMARY OF THE INVENTION

The present disclosure is for cooling battery packs and other devices using SCF as coolant. The cooling fluid is maintained inside a sealed enclosure at its supercritical and/or other appropriate thermodynamic state beneficial to a battery's optimal operation. We will use the terms "sealed enclosure" and "tank" interchangeably. An outer jacketed vessel, and a network of heat conducting pipes, containing water or another suitable coolant, will be used to remove heat rapidly and efficiently. Unlike other fluid-based coolant systems, wherein the cooling fluid is moved through complex cooling circuit(s), SuCCoR cools batteries and other machines by immersing them in a supercritical fluid bath contained in a sealed enclosure. We point out that some other previous inventions also enable cooling by sealing liquid and/or gas phase coolants with the devices in an enclosure. However, our invention differs significantly by its use of SCF coolants, which are neither distinctly liquid or gas phases. The SuCCoR system will help us avoid the need for a distinct cooling circuit because the conduction and convection processes created naturally by the temperature gradient between the hot region near the battery and the relatively colder temperatures at the outer tank walls will drive the cooling. Furthermore, the coolant fluid is kept in its supercritical state, and will not evaporate or condense as in a gas-liquid (two-phase) cooling system. Such a two-phase cooling method may rapidly fail by "vapor locking", which manifests because over three-orders of magnitude expansion of volume during evaporation can result in very poor gas cooling compared to that achieved by a liquid phase. The fluid tank may be fitted with at least one pressure safety valve to prevent excess pressure build-up, and at least one pressurization valve to maintain pressure of the coolant to above its critical pressure value. The tank may also be fitted with one or more of electric resistance heaters to raise battery/device temperature to optimal value during cold weather by heating the SCF fluid. The SuCCoR system eliminates complicated and expensive pumps used in conventional thermal management systems, and can thus make battery packs lighter, and more powerful. It may also increase batteries' lifetimes by reducing their degradation rate by minimizing (or even eliminating) temperature gradients generated between various battery layers during operation because of the molecular-level penetration and contact of the SCF fluid molecules with the various battery layers removed heat efficiently and evenly.

This summary only provides a short overview, and not a comprehensive description, of some of the subject matter's functionality. Other systems, methods, features and advantages provided herein will become apparent to one skilled in the art, science, and engineering upon examination of the following figures and description. It is our intent that all such additional advantages, features, methods, and systems, that are included within this description, be within the scope of the claims.

BRIEF DESCRIPTION OF THE FIGURES

The attached drawings referenced below help understand the inventive subject matter in the following description of non-limiting embodiments.

DETAILED DESCRIPTION OF THE INVENTION

The subject matter herein is on methods and systems that use cooling fluids in a supercritical state to cool batteries and components of powered systems. The cooled components include, but are not limited to, batteries, cells, computer chips, motors, transformers, and similar machines. The coolants described herein can be supercritical refrigerants possessing superior heat transfer properties (relative to other known coolants), and which can operate at optimal and/or elevated temperatures. Examples of refrigerants that may be used as supercritical coolants in one or more embodiments described herein include Carbon dioxide, R134A, and/or R1234yf.

The supercritical coolants will be contained in a sealed fluid tank with conveniently tailored geometries appropriate for the device being used. The battery or device assembly will be fully or partially immersed inside this supercritical coolant bath. This allows for the supercritical coolants to be held at or near the limits of the insulation, and provide superior heat removal right at the heat source. Once pressurized and sealed, the fluid tank will maintain its pressure for many months of time like gas tanks do.

Figure 1:
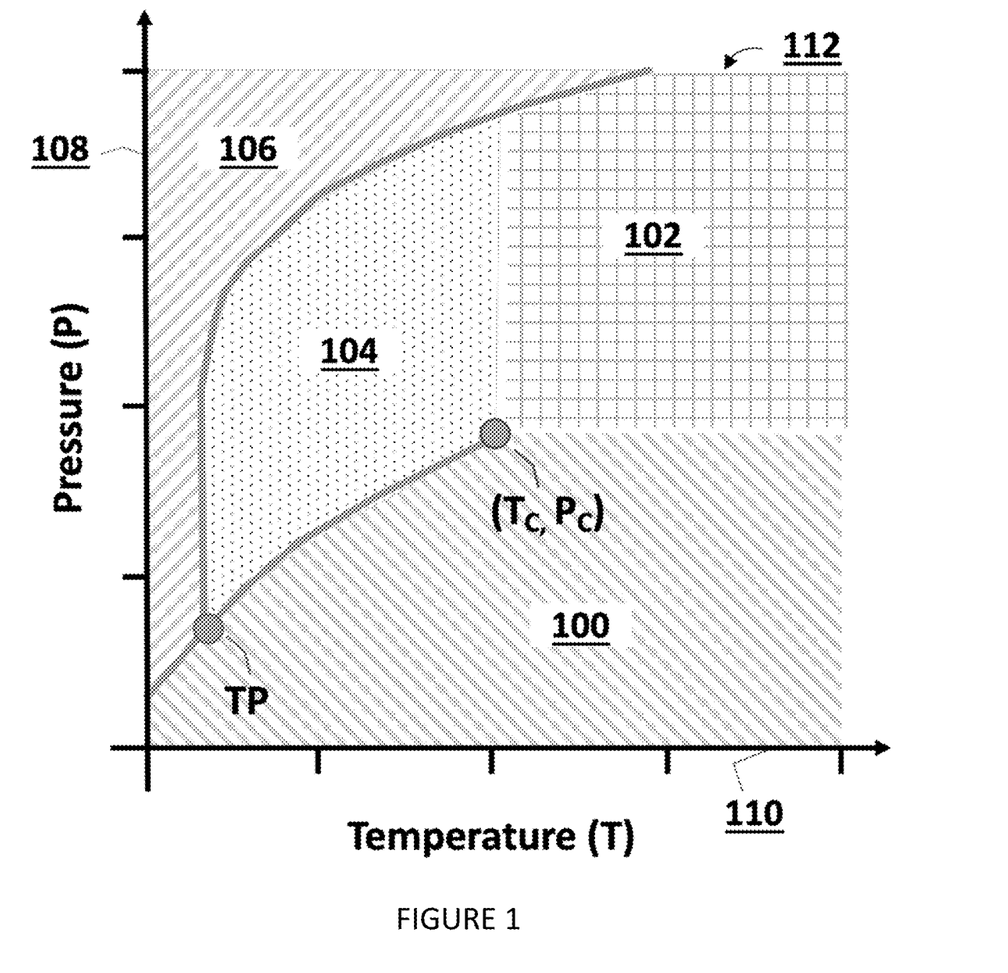
FIG. 1 illustrates one example of a phase diagram for a cooling fluid, highlighting the supercritical region.

FIG. 1 illustrates one example of a phase diagram (112) for a cooling fluid (also referred to as a coolant or refrigerant). A SCF is a substance existing in conditions beyond a critical point associated with the fluid, such as when the fluid is above a critical temperature ($T_C$) and a critical-pressures ($P_C$). The phase diagram (112) shows several shaded areas (100), (102), (104), and 106, shown alongside a horizontal axis (110) and a vertical axis (108). Each shaded area (100), (102), (104), (106) represents a different phase of the same coolant. The horizontal and vertical axes respectively labeled (110) and (108) represent different temperatures and pressures. At temperature and pressure values within the first area (100), the coolant is in a gaseous state. At greater pressures, the coolant may transition to another state depending on its temperature. For example, at low enough temperatures, the coolant may transition to a solid state (e.g., the shaded area (106)). Or, at hotter temperatures it can become a liquid (e.g., the shaded area (104)).

The point in the phase diagram (112) given by the coordinates (Tc, Pc) is the critical point. It represents the highest temperature and pressure at which the vapor and liquid phases co-exist in equilibrium. Above (Tc, Pc), the coolant transitions to a supercritical state (e.g., the shaded area (102)). In the supercritical state, some coolants (for example Carbon dioxide and R1234yf) can have the density of liquid but the viscosity of a gas, and be able to operate as a dielectric over a wide range of temperatures from near ambient to high (for example above 130 degrees Celsius). The reduced density and viscosity of the supercritical coolant can allow it to easily move around the batteries, between closely spaced components, and/or through a cooling circuit, with the expense of little external work. Also, the ability of the supercritical coolant to operate in hotter temperatures and its higher thermal conductivity (compared to the gas phase) can allow it to more efficiently cool batteries and machines by transferring heat via conduction and convection processes than many gases and liquids. The specific heat of a SCF is also significantly higher compared to its gaseous state. Importantly, supercritical fluids are dielectric fluids and can effectively flow through sub-micron sized channels, and around cells and batteries without risking short circuits in the battery packs. Thus, they can rapidly absorb a larger quantity of heat released during the operation of batteries and devices but display a much smaller rise in the temperatures near these devices, which keep them cooler than otherwise possible. This can allow for a cooling system that uses the supercritical fluid to be smaller in size, optionally consume less power, operate more efficiently with high rates of heat removal, become less expensive to maintain, and possess superior performance than currently known conventional cooling systems used to cool batteries and devices.

Figure 2:
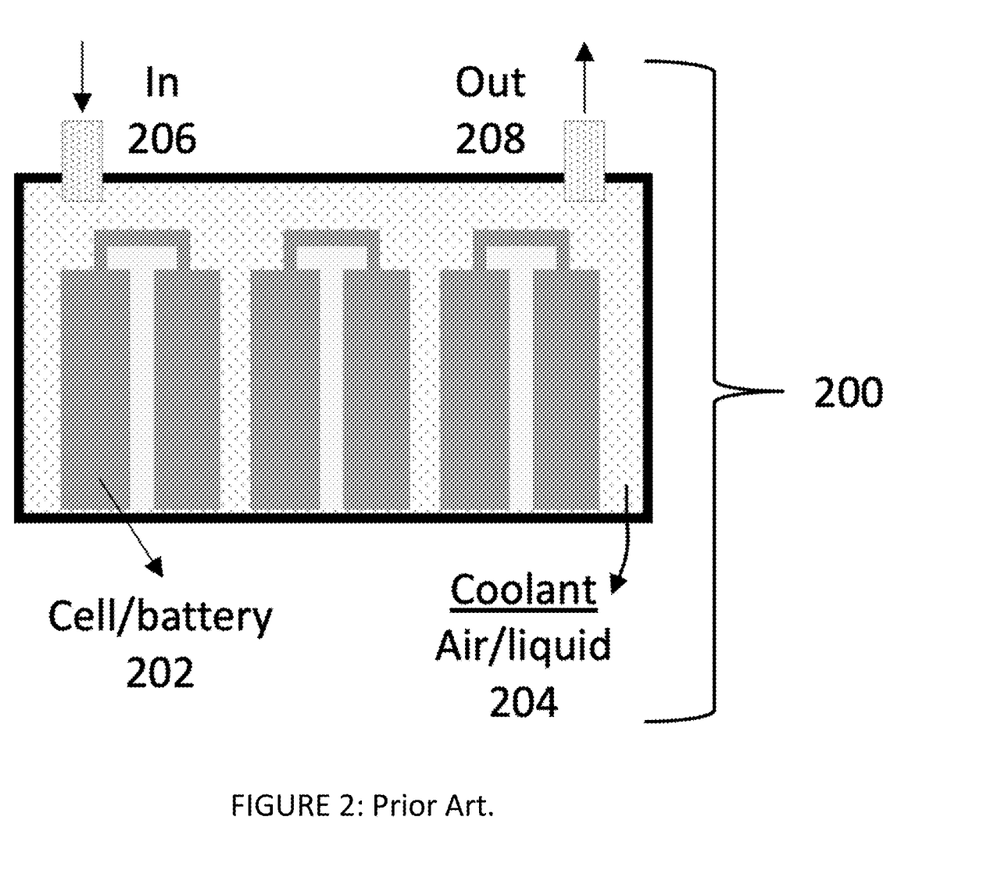
FIG. 2 illustrates one embodiment of a conventional method for cooling batteries and devices using a coolant; and c)

FIG. 2 schematically illustrates one embodiment of a conventional cooling system (200). The cooling system (200) can operate to reduce a temperature of one or more batteries or devices (202) of a powered system using a coolant fluid (204). The said fluid, which may be air or liquid, flows into the system via an inlet (206) and exits via an outlet (208) carrying with it a part of the heat produced by the operating device. Experience shows that both immersion and cooling channel methods used in conventional cooling systems consume power because the coolant is pumped around the battery. While air cooling is cheap and consumes less power, it also suffers from poor performance. In comparison, liquid cooling performs better but comes at a higher cost and power demand. Conventional immersion cooling also requires expensive dielectric fluids to mitigate the risk of electrical short circuit in battery packs and other electrical systems.

Figure 3:
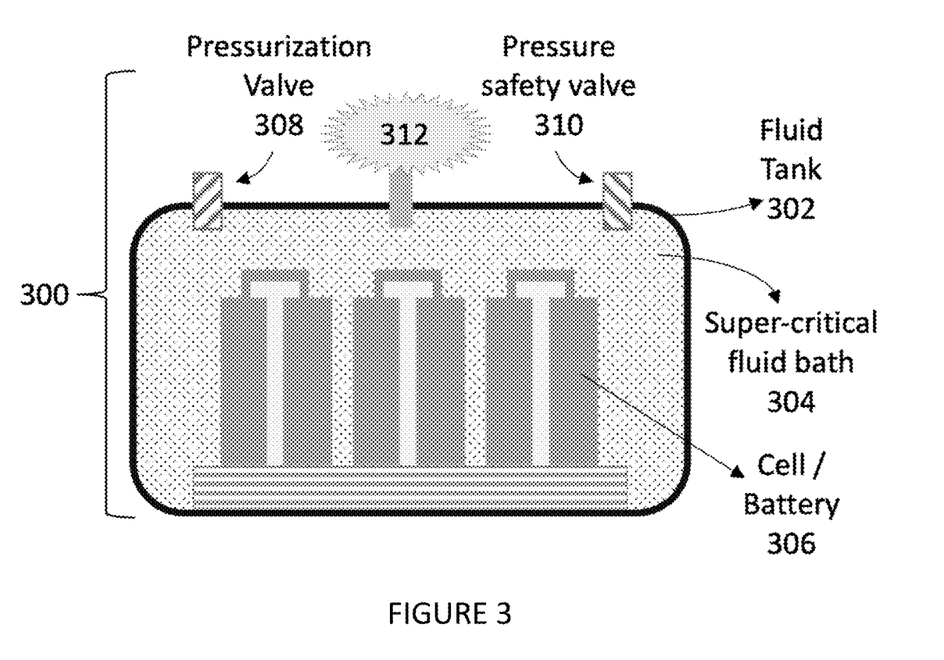
FIG. 3 illustrates one embodiment of our SuCCoR system wherein batteries and devices are cooled by immersing them in a coolant bath contained in a sealed tank. The coolant may be in its supercritical state and/or in some other suitable neighboring physical state. It will be electrically non-conducting and a good thermal conductor.

FIG. 3 labeled (300) schematically illustrates one embodiment of our Super Critical Cooling Regulator (SuCCoR) system. The cooling system (300) can operate to reduce a temperature of one or more battery packs and/or devices in a powered system. As one example, (306) can represent a battery pack, an electric motor, a smart grid, or the like that can generate significant heat during its operation.

One embodiment of the SuCCoR system (300) shown in FIG. 3 includes a sealed fluid tank (302). The fluid tank (302) contains a SCF bath (304) into which the battery packs and/or devices that must be cooled are fully or partially immersed. It also includes one or more conduits, containers, jackets, or the like, to enable holding pressurized coolant as described herein. One or more pressurization valve/pump (308) may be present to control (e.g., increase) coolant pressure inside the fluid tank (302) to above its critical value ($P_C$). Additionally, one or more pressure safety valves (310) may be provided to prevent pressure buildup to beyond safe levels prescribed by the fluid tank design. This embodiment may also contain one or more of electric resistance heaters to raise battery/device temperature to optimal value during cold weather by heating the SCF fluid, and sensor(s) (312) to monitor temperature (T) and pressure (T) values of SCF fluid in the inner tank, which can guide efficient cooling. Cooling fins may additionally be attached to various fluid tank walls, and augmented further by using perforated metal cooling plates in the vicinity of the devices, to speed heat transport and dissipation. The use of perforated metal plates will allow SCF fluids to pass around freely within the tank. Since the SCF may be under higher than ambient pressures, if necessary, we may surround the battery by a protective skeleton. Many cheap, lightweight, heat conductive, and easy to fabricate materials can fulfill this purpose.

Figure 4:
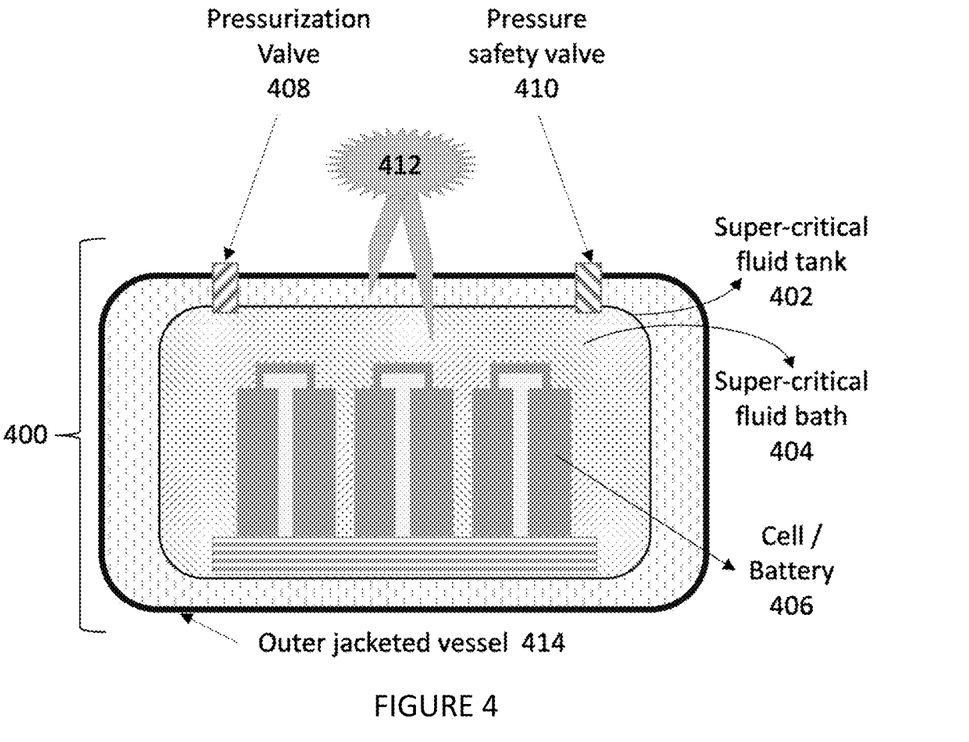
FIG. 4 illustrates another embodiment of our SuCCoR system wherein batteries and devices are cooled by immersing them in a coolant bath contained in an inner sealed tank. The coolant may be in its supercritical state and/or in some other suitable neighboring physical state. It will be electrically non-conducting and a good thermal conductor. The inner fluid tank is surrounded by an external jacketed vessel containing another coolant with higher thermal conductivity and specific heat capacity.

With continued reference to the SuCCoR system, consider another embodiment (400) schematically illustrated in FIG. 4. This is similar to embodiment (300) in many ways. Additionally, it also includes an outer jacketed vessel (414) around the SCF tank (402) holding a high thermal conductivity and high specific heat fluid, for example water, which may even be electrically conductive. This fluid bath in the outer jacketed vessel can increase the efficacy of the SuCCoR system's cooling ability by holding the heat removed by the supercritical fluid in the inner fluid tank, which was transferred across the walls of the fluid tank, while maintaining a remarkably lower overall temperature. It is not a far-fetched idea to use chilled water or other such coolants in the outer jacket to enhance cooling efficiency. Although not shown in our schematic embodiments of the SuCCoR system, we can also create a mesh network of sealed pipes made of high thermal conductivity materials such as copper and other metals, to carry coolants inside both inner and outer tanks, which can enhance the efficiency of heat transfer from SCF and promote faster cooling. This embodiment may also contain one or more of electric resistance heaters to raise battery/device temperature to optimal value during cold weather by heating the SCF fluid, and sensor(s) (412) to monitor of the P and T values of fluids in the inner tank and outer jacketed vessel, which can guide efficient cooling. It is worthwhile to note that the outer jacket vessel can use high conducting coolant fluid like water, which also has a high specific heat capacity, without worrying about causing an electrical short-circuit because this fluid will not come in direct contact with the cooled electrical devices like the SCF (404) does inside the inner tank (402). Cooling fins may additionally be attached to various fluid tank walls, and augmented further by using perforated metal cooling plates in the vicinity of the devices, to speed heat transport and dissipation. The use of perforated metal plates may allow SCF fluids to pass around freely within the tank.

With continued reference to the SuCCoR system (300) shown in FIG. 3 and (400) shown in FIG. 4, we now make a few observations about the tanks (302), (402), and (414) holding the cooling fluids. A typical diving cylinder, scuba tank or diving tank will work well as the fluid tank 302. They are typically manufactured from aluminum alloys, steels, and filament wound composite materials, and can hold pressures over a wide range (18 MPa-30 MPa). They can, therefore, withstand supercritical pressures of many typical cooling fluids. For example, the Pc of Carbon-di-oxide is 7.39 MPa. They can be manufactured using well-established, cost-effective processes into many desired tank geometries. These tank materials also have high thermal conductivities and allow us to efficiently transfer the heat trapped in SCF to much cooler regions far from the devices, which will enhance the rate of cooling. Modern fluid enclosures are largely impermeable to many fluids and can keep them well-contained at the desired high pressures for many months of time. Note that application of well-established materials selection processes will help identify lightweight and strong materials to custom-design fluid tanks used for cooling in automotive applications, and also help us generally reduce overall weights of the thermal management system. Again, since the SCF will be under higher than ambient pressures, if necessary, we may need to surround the battery by a protective skeleton covering.

Figure 5:
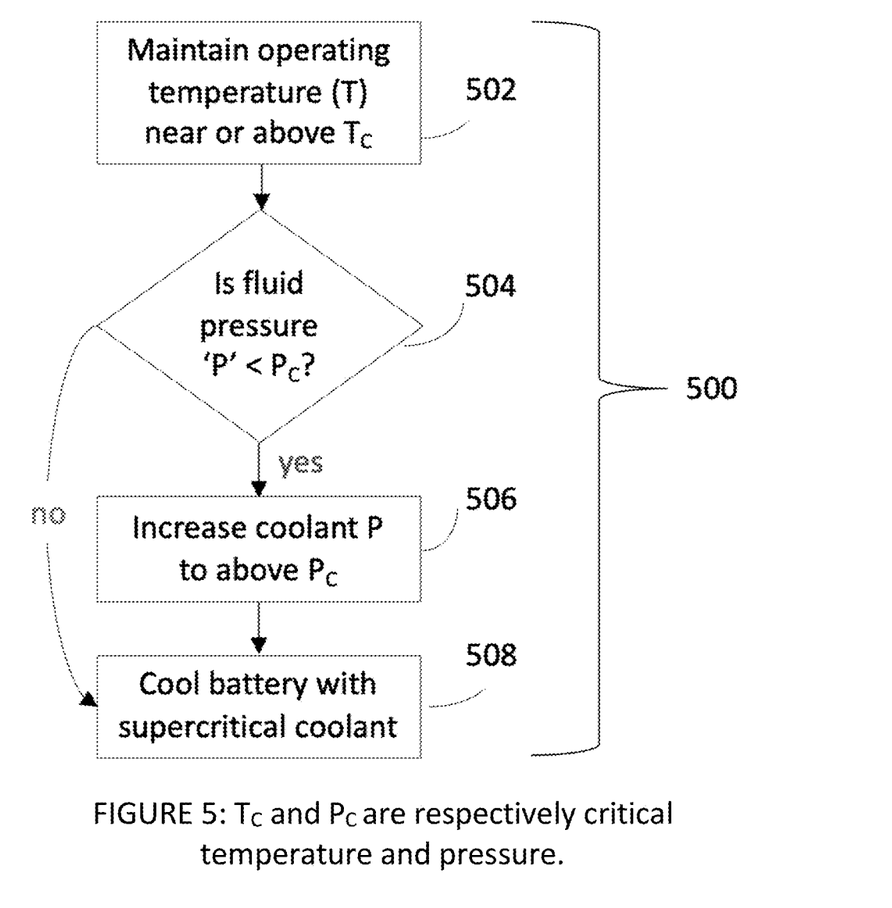
FIG. 5 illustrates a flowsheet diagram of how our SuCCoR system cools the battery packs and/or devices by tailoring temperature and pressure of the fluid to values above the critical point.

FIG. 5 labeled (500) illustrates a flowchart that envisages coupling a grid of P/T sensors arranged inside the supercritical and the jacketed fluid tanks to a smart control system connected to one or more microprocessors and/or integrated circuits. This will allow the system to vary (T, P) values in real time to levels needed to efficiently operate the SuCCoR system. For example, our said controller can communicate through wired and/or wireless connections with both temperature and pressure sensors, and spatially map (T, P) values of the coolant over the entire spatial extent of the fluid tank. This information can help tailor pressure of the coolant to appropriate levels to ensure efficient cooling by transitioning the coolant from a gas state to a supercritical state.

The example figures provided above illustrate ways to implement our disclosed invention. Nevertheless, experts skilled in the art, science, and engineering could develop additional embodiments to practice the disclosed subject matter using this disclosure and each is intended to be included herein. In addition to the above-described embodiments, experts will appreciate that this disclosure has application in various arts, engineering, technology, and situations, and this disclosure is intended to include the same.

The invention claimed is:

1. A supercritical cooling regulator (SuCCoR): comprising of a plurality of sub-systems, including:
   a sealed fluid tank with the cooling fluid, which is a refrigerant, maintained at a pressure in a vicinity of the supercritical pressure ($P_C$) of the cooling fluid, wherein the cooling fluid is in a supercritical state at a temperature to which a device is exposed to;
   the device includes one or more of battery pack(s), a smart-grid, a transformer, and/or some heat generating mechanical, electrical, and/or electronic device that needs to be cooled;
   the cooling fluid in its supercritical state is an electrical non-conductor but a good heat conductor, which prevents electric short-circuit of the device, which is immersed in the cooling fluid;
   the cooling fluid in the supercritical state is distinct from having liquid and gas phases;
   the cooling fluid in the supercritical state will not undergo evaporation or condensation;
   an optional pressurization valve to raise the fluid pressure to above the critical pressure $P_C$ of the cooling fluid if necessary;
   an optional pressure safety valve to release excess fluid pressure and maintain safe pressure levels during operation;
   optional sensors to monitor the pressure and temperatures of the cooling fluids in the inner sealed fluid tank and outer jacketed vessel;
   an optional heater to heat the cooling fluid during cold weathers to keep the device at optimal operating temperatures;
   an outer jacketed vessel around the cooling fluid tank to hold a high thermal conductivity and high specific heat fluid to enhance the cooling ability by holding the heat removed by the supercritical fluid in the sealed fluid tank, at a lower overall temperature because of its high specific heat capacity;
   an optional network of cooling fins and thermally conducting pipes to carry cooling fluids in the sealed inner fluid tank and the outer jacketed vessel;
   an optional fluid mixer to stir the fluid;
   for which cooling fluid pressure in the sealed tank remains stable for many months of time;
   for which there is no limitation and/or constraint on the dimensions and geometry of the device that can be cooled; and
   for which heat generated by the device, which is immersed in the cooling fluid, is transported towards cooler tank walls via efficient molecular level conduction and convection processes.

* * * * *